United States Patent
Yoo et al.

(10) Patent No.: US 12,340,686 B2
(45) Date of Patent: Jun. 24, 2025

(54) METHOD FOR PREDICTING A PASSAGE TIME OF AN INTERSECTION IN CONSIDERATION OF IRREGULAR ROTATION AND SIGNAL WAITING, AND DEVICE USING THE SAME

(71) Applicant: HYUNDAI AUTOEVER CORP., Seoul (KR)

(72) Inventors: Hyun Sang Yoo, Seoul (KR); Sang Kyu Son, Seoul (KR); Ah Young Kang, Hwaseong-si (KR); Ru Da Rhee, Seoul (KR); Jae Hong Eom, Seongnam-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 321 days.

(21) Appl. No.: 18/083,162

(22) Filed: Dec. 16, 2022

(65) Prior Publication Data

US 2023/0206754 A1    Jun. 29, 2023

(30) Foreign Application Priority Data

Dec. 23, 2021   (KR) .......................... 10-2021-0186117

(51) Int. Cl.
*G08G 1/01*      (2006.01)
*G06N 3/08*      (2023.01)
*G08G 1/052*     (2006.01)

(52) U.S. Cl.
CPC ............. *G08G 1/0129* (2013.01); *G06N 3/08* (2013.01); *G08G 1/0145* (2013.01); *G08G 1/052* (2013.01)

(58) Field of Classification Search
CPC .... G08G 1/0129; G08G 1/0145; G08G 1/052; G06N 3/08
See application file for complete search history.

(56) References Cited

U.S. PATENT DOCUMENTS

| | | | | |
|---|---|---|---|---|
| 10,002,530 | B1* | 6/2018 | Liu | G08G 1/0129 |
| 11,557,202 | B2* | 1/2023 | Xiong | G08G 1/0962 |
| 2019/0122547 | A1* | 4/2019 | Gaither | G08G 1/0133 |
| 2019/0172344 | A1* | 6/2019 | Baik | G08G 1/0141 |
| 2019/0272748 | A1* | 9/2019 | Cross | G08G 1/005 |
| 2020/0135017 | A1* | 4/2020 | Ma | G08G 1/0141 |
| 2021/0241618 | A1 | 8/2021 | Huang et al. | |
| 2024/0371264 | A1* | 11/2024 | Budan | G06N 3/04 |

FOREIGN PATENT DOCUMENTS

| | | |
|---|---|---|
| JP | 5256924 B2 | 8/2013 |
| JP | 2013196612 A | 9/2013 |
| JP | 2014044649 A | 3/2014 |
| JP | 2021519933 A | 8/2021 |
| KR | 20200026031 A | 3/2020 |
| KR | 20200040462 A | 4/2020 |

OTHER PUBLICATIONS

Office Action cited in corresponding Korean patent application No. 10-2021-0186117; Jun. 20, 2024; 10 pp.

* cited by examiner

*Primary Examiner* — Naeem Taslim Alam

(74) *Attorney, Agent, or Firm* — Lempia Summerfield Katz LLC

(57) ABSTRACT

Disclosed are an apparatus and a method for predicting a passage time and a driving time of vehicles in a waiting line section, which pass through the waiting line section disposed behind an intersection. The apparatus inputs information on speeds of the vehicles to a trained prediction model and more accurately predicts the time for users to arrive at his or her destinations.

15 Claims, 5 Drawing Sheets

METHOD FOR PREDICTING A PASSAGE TIME OF AN INTERSECTION IN CONSIDERATION OF IRREGULAR ROTATION AND SIGNAL WAITING, AND DEVICE USING THE SAME

CROSS REFERENCE TO RELATED APPLICATION

This application claims priority to Korean Patent Application No. 10-2021-0186117, filed on Dec. 23, 2021, the disclosure of which is hereby incorporated by reference in its entirety.

BACKGROUND

1. Field of Technology

The present disclosure relates to a method of predicting an intersection passage time based on irregular delay and signal waiting. The present disclosure also relates to a device or an apparatus using the same.

2. Related Technology

The statements in this section merely provide background information related to the present disclosure and may not constitute prior art.

A traffic flow means the number of vehicles that passes through one point for a unit time. An uninterrupted flow means a traffic flow in which an external influence that controls a traffic flow is not involved. An interrupted flow means a traffic flow which is interrupted by a traffic light or another external influence and thus the traffic flow is not continuous.

Examples of the interrupted flow may include a signal intersection, a non-signal intersection, and a rotation intersection. At such an intersection, a traffic flow is congested and thus a waiting line may be formed. This may result in a cause, such as delay in entering the intersection and waiting for a signal.

Even though a waiting line may have a great influence on a vehicle speed and a predicted destination arrival time of a vehicle, a waiting line formed in an interrupted flow has a problem in that a collection rate for traffic information is low. Accordingly, there is a problem in that it is difficult to predict an accurate driving time to arrive at a destination.

As an artificial intelligence technology is recently spotlighted, research of the artificial intelligence technology is actively carried out. If a technology using an artificial neural network, among such artificial intelligence technologies, is used, it is considered that a user can be provided with guidance of a reliable passage time and destination arrival time by accurately predicting a traffic situation and an interrupted flow.

SUMMARY

In such a background, an object of the present embodiment is to calculate a passage time in a waiting line section according to a direction of progress of a vehicle at an intersection, calculate a route along which the vehicle may reach a destination with a minimum time by deriving a predicted passage time in each future direction of progress of the vehicle by using a prediction model, and provide the route to the user.

In an embodiment of the present disclosure, a method of predicting a passage time includes: collecting traffic information including speeds of vehicles that pass through a waiting line section disposed behind an intersection in each direction of progress of the vehicles in the waiting line section; calculating passage times of vehicles that pass through the waiting line section in each direction of the progress based on the traffic information and a length of the waiting line section and calculating an average passage time in each direction of the progress based on the passage times; inputting the average passage time to a prediction model trained to predict a future passage time; and deriving a predicted passage time in each direction of the progress from the trained prediction model.

In an embodiment, the average passage time may be derived by calculating the passage times corresponding to 10 minutes before and after derivation timing of the vehicles that have passed through the waiting line section in each direction of the progress by using an arithmetic mean method. The derivation timing may indicate timing of a 5-minute unit at which the average passage time is derived.

A speed that is collected in a 5-minute unit may have a missing value. However, since passage times of the vehicles before and after derivation timing of the vehicles are processed again by using the arithmetic mean method, a missing value can be corrected. Furthermore, since near past traffic information and near future traffic information are equally integrated, an irregular movement in the passage time of the vehicle attributable to the delay in entering an intersection or the signal waiting at an intersection can be smoothed.

In another embodiment, the prediction model may be trained by receiving the average passage times that have been accumulated from the past according to time series. The average passage times that have been accumulated from the past may be derived by calculating the passage times corresponding to 10 minutes before and after derivation timing of the vehicles that have passed through the waiting line section in each direction of the progress by using an arithmetic mean method. The derivation timing may indicate timing of a 5-minute unit at which the average passage time is derived. The predicted passage time may be derived by being divided in a unit of 5 minutes up to an hour in a future from an actual time in each direction of the progress.

In the method of predicting a passage time, the waiting line section may be differently set for each direction of the progress of the vehicles.

In an embodiment, the trained prediction model may be a model trained by deep learning based on an artificial neural network.

In an embodiment, the method of predicting a passage time may further include generating waiting line section information including a length, a road grade, a road type, and the number of lanes of the waiting line section, a signal type of the intersection for each direction of the progress and environment information including information on a day of the week, a time, and an administrative district. The average passage time, the waiting line section information, and the environment information may be input to the trained prediction model.

In another embodiment of the present disclosure, an apparatus (or a device) for predicting a passage time includes a collection circuit configured to collect traffic information. The traffic information includes speeds of vehicles that pass through a waiting line section disposed behind an intersection in each direction of progress of the vehicles in the waiting line section. The apparatus further includes: an arithmetic circuit configured to calculate passage times of vehicles that pass through the waiting line section in each direction of the progress based on the traffic information and a length of the waiting line section and configured to calculate an average passage time in each direction of the progress based on the passage times; and a prediction circuit including a prediction model trained to predict a future passage time and configured to input the average passage time to the trained prediction model and configured to derive a predicted passage time in each direction of the progress.

In another embodiment, the arithmetic circuit may derive the average passage time by calculating the passage times corresponding to 10 minutes before and after derivation timing of the vehicles that have passed through the waiting line section in each direction of the progress by using an arithmetic mean method. The derivation timing may indicate timing of a 5-minute unit at which the average passage time is derived. A speed that is collected in a 5-minute unit may have a missing value. However, since passage times of the vehicles before and after derivation timing of the vehicles are processed again by using the arithmetic mean method, a missing value can be corrected. Furthermore, since near past traffic information and near future traffic information are equally integrated, an irregular movement in the passage time of the vehicle attributable to the delay in entering an intersection or the signal waiting at the intersection can be smoothed.

In an embodiment, the apparatus may further include a management circuit configured to generate waiting line section information including a length, a road grade, a road type, and the number of lanes of the waiting line section, a signal type of the intersection for each direction of the progress and environment information including information on a day of the week, a time, and an administrative district.

In another embodiment, the apparatus may further include a transmission circuit configured to transmit the predicted passage time to a vehicle navigation management server.

In other embodiment, the apparatus may further include a learning circuit configured to train the prediction model by inputting, to the prediction model, the average passage times that have been accumulated from the past according to time series. The average passage times that have been accumulated from the past may be derived by calculating passage times corresponding to 10 minutes before and after derivation timing of the vehicles that have passed through the waiting line section in each direction of the progress by using an arithmetic mean method. The derivation timing may indicate timing of a 5-minute unit at which the average passage time is derived.

In another embodiment of the present disclosure, a method of predicting a driving time includes: collecting traffic information including speeds of vehicles that pass through waiting line sections disposed behind intersections in each direction of progress of the vehicles in the waiting line sections; calculating passage times of vehicles that pass through the waiting line sections for each waiting line section and for each direction of the progress based on the traffic information and lengths of the waiting line sections; and calculating an average passage time in each direction of the progress based on the passage times. The method further includes; inputting the average passage time to a prediction model trained to predict a future passage time; deriving predicted passage times in each direction of the progress from the trained prediction model; and deriving a route having a smallest sum of predicted passage times, among the waiting line sections through which the vehicles pass through in order to arrive at their destinations.

In one embodiment, the average passage time may be derived by calculating the passage times corresponding to 10 minutes before and after derivation timing of the vehicles that have passed through the waiting line sections in each direction of the progress by using an arithmetic mean method. The derivation timing may indicate timing of a 5-minute unit at which the average passage time is derived. A speed that is collected in a 5-minute unit may have a missing value. However, since passage times of the vehicles before and after derivation timing of the vehicles are processed again by using the arithmetic mean method, a missing value can be corrected. Furthermore, since near past traffic information and near future traffic information are equally integrated, an irregular movement in the passage time of the vehicle attributable to the delay in entering an intersection or the signal waiting at the intersection can be smoothed.

In another embodiment, the method may further include generating waiting line section information including a length, a road grade, a road type, and the number of lanes of the waiting line section, a signal type of the intersection for each direction of the progress and environment information including information on a day of the week, a time, and an administrative district. The trained prediction model may be a model trained by deep learning based on an artificial neural network. The average passage time, the waiting line section information, and the environment information may be input to the trained prediction model.

In one embodiment, the prediction model may be trained by receiving the average passage times that have been accumulated from the past according to time series. The average passage times that have been accumulated from the past may be derived by calculating the passage times corresponding to 10 minutes before and after derivation timing of the vehicles that have passed through the waiting line section in each direction of the progress by using an arithmetic mean method. The derivation timing may indicate timing of a 5-minute unit at which the average passage time is derived. The predicted passage time may be derived by being divided in a unit of 5 minutes up to an hour in a future from an actual time in each direction of the progress.

As described above, the present disclosure can accurately predict when a user arrives at a destination by accurately predicting the time when a vehicle passes through an intersection for each direction of progress of the vehicles. Furthermore, the present disclosure can solve a problem that a collection rate may be low when the speed is collected from vehicles that fully pass through an intersection in each direction of progress of the vehicles and thus reliability may be low as it is predicted based on information having a low collection rate. Furthermore, there is an effect in that a stable passage time in a waiting line for each direction of progress, which may be degressively reliable to a vehicle with respect to an inconsistent passage time attributable to the irregular occurrence of delay within an intersection section or the signal waiting for each vehicle, can be predicted.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF EMBODIMENTS

Figure 1:
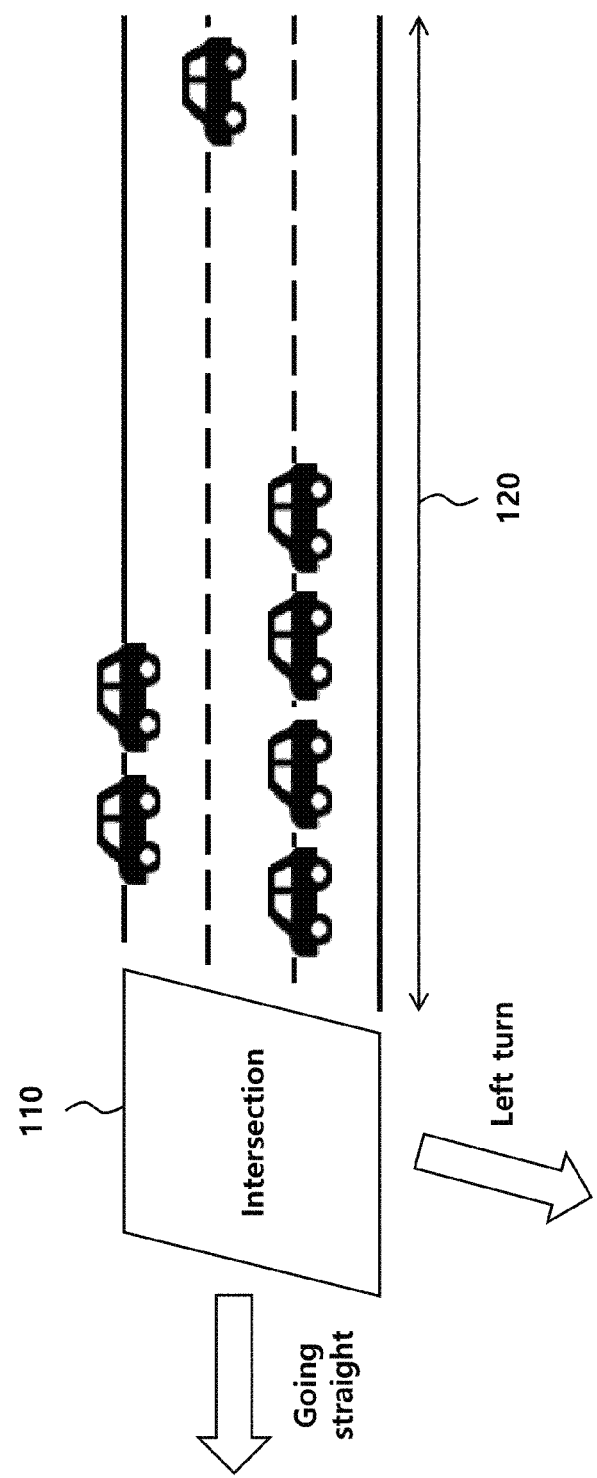
FIG. 1 is a diagram for schematically depicting an intersection and a waiting line section in an embodiment of the present disclosure.

Hereinafter, some embodiments are described in detail with reference to the drawings. In adding reference numerals to the elements of each drawing, it should be noted that the same elements have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof has been omitted.

Furthermore, in describing elements of an embodiment of the present disclosure, terms, such as a first, a second A, B, (a), and (b), may be used. Such terms are used only to distinguish one component from another component, and the essence, order, or sequence of a corresponding component is not limited by the terms. When it is said that one component is "connected", "combined", or "coupled" to another component, the one component may be directly connected or coupled to another component, but it should also be understood that a third component may be "connected", "combined", or "coupled" between the two components.

When a component, device, element, or the like of the present disclosure is described as having a purpose or performing an operation, function, or the like, the component, device, or element should be considered herein as being "configured to" meet that purpose or to perform that operation or function.

FIG. 1 is a diagram for schematically describing an intersection and a waiting line section in an embodiment of the present disclosure.

According to an embodiment, a waiting line section 120 may be preset behind an intersection 110. The speeds of vehicles that pass through the intersection 110 may be reduced or stopped for various reasons, such as stopping due to a signal by a traffic light disposed in the intersection, or stopping or reducing the speed of the vehicles in order to make a left turn or a right turn. The waiting line section 120 may mean a section in which the vehicle may be stopped or may run for various reasons at the intersection 110.

The waiting line section 120 may be differently set for each direction (e.g., a left turn, a right turn, or going straight) of progress of the vehicle at the intersection. Accordingly, the passage time of the vehicle can be more accurately predicted because the waiting line section 120 is individually determined based on the direction of progress of the vehicle when the passage time of the vehicle in the waiting line section through a prediction model is predicted.

The length, road grade, road type, and the number of lanes of the waiting line section 120, a signal type, information on a day of the week, a time, and an administrative district of the intersection 110, etc. may be previously stored within a management circuit of an apparatus for predicting a passage time according to the present embodiment.

Speed information for the waiting line section 120 may be collected by a probe device that has entered and fully passed through the waiting line section 120 for each direction or may be collected by a probe device installed in a road.

As illustrated in FIG. 1, waiting lines attributable to various reasons, such as a waiting line that is generated by a traffic light indicative of a going-straight or left turn signal and a waiting line that is generated for vehicles to make a turn may be generated in the intersection 110.

Furthermore, a predicted passage time may be calculated by calculating a passage time in a waiting line sections by using the speed of a vehicle at the waiting line section and smoothing and using the calculated passage time as the mean. Accordingly, the predicted passage time may be a passage time in which all of waiting attributable to a traffic light disposed at the intersection 110 and delay in entering the intersection 110 have been incorporated.

An intersection according to the present embodiment may include an intersection having a five-way intersection or more at which a vehicle may proceed even in a going straight direction, a left turn direction, a right turn direction, and a diagonal direction, in addition to the intersection 110 illustrated in FIG. 1.

Figure 2:
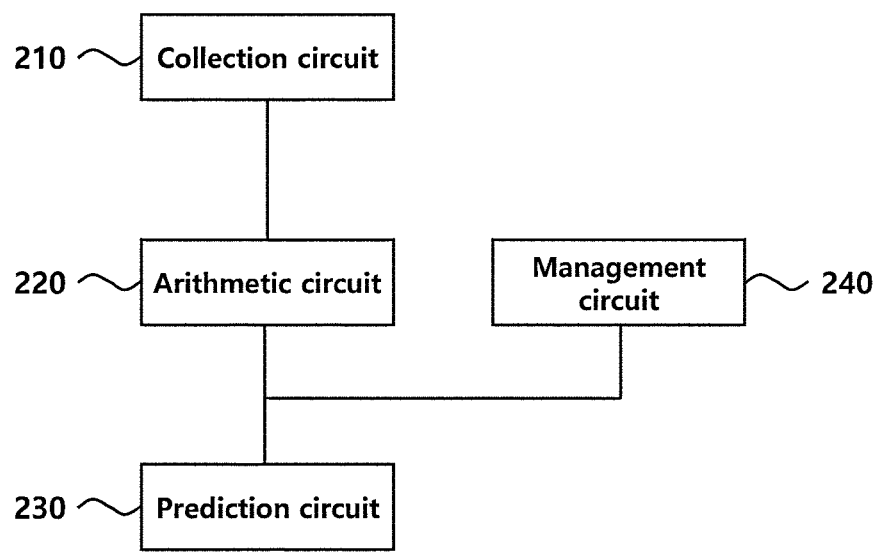
FIG. 2 is a diagram for schematically illustrating an apparatus or a device for predicting a passage time according to an embodiment of the present embodiment.

FIG. 2 is a diagram for describing an apparatus (or a device) for predicting a passage time according to one embodiment.

The apparatus 200 for predicting a passage time may include a collection circuit 210, an arithmetic circuit 220, and a prediction circuit 230, and may further include a management circuit 240.

The collection circuit 210 may collect traffic information, including the speeds of vehicles that pass through a waiting line section that is disposed behind an intersection, in each direction of progress of the vehicles in the waiting line section. The traffic information that is collected by the collection circuit 210 may include the speeds of the vehicles in each direction of progress at the intersection. The waiting line section may be differently set for each direction of progress of the vehicles.

The traffic information that is collected by the collection circuit 210 may be collected by a probe device installed in each vehicle or may be collected by a probe device installed in a road.

The arithmetic circuit 220 may calculate passage times of vehicles for each direction of progress of the vehicles that pass through a waiting line section based on traffic information and the length of the waiting line section, and the arithmetic circuit 220 may calculate an average passage time of the vehicles in each direction of progress based on the passage times. The length of the waiting line section may be previously stored in the apparatus 200 for predicting a passage time. Specifically, the length of the waiting line section may be previously stored in the arithmetic circuit 220 of the apparatus 200 for predicting a passage time. If the apparatus 200 for predicting a passage time further includes the management circuit 240, the length of the waiting line section may be previously stored in the management circuit 240.

The arithmetic circuit 220 calculates a passage time in each direction of progress of a vehicle. Accordingly, the arithmetic circuit 220 may predict a future passage time of the vehicle in a waiting line section for each direction of progress of the vehicles depending on which direction the vehicle proceeds. Since smoothed passage times of vehicles in a waiting line section are used, it may be considered that all of pieces of information, such as information of the signal waiting, the delay in entering an intersection, etc., have been incorporated into an average passage time. Furthermore, an average passage time of vehicles that pass through waiting line sections may be calculated and derived by using an arithmetic mean method. Specifically, the average passage time is derived by calculating passage times of the vehicles in the waiting line sections, which correspond to 10 minutes before and after derivation timing of vehicles that pass through the waiting line sections in each direction of progress, through the arithmetic mean method. The derivation timing may indicate timing of a 5-minute unit at which the average passage time is derived. Accordingly, more accurate passage times of vehicles can be predicted with respect to an irregular signal and waiting time for the vehicles to enter an intersection by calculating and smoothing the passage times of the vehicles in waiting line sections through the arithmetic mean method as described above. That is, a speed that is collected in a 5-minute unit may have a missing value. However, since passage times of the vehicles before and after derivation timing of the vehicles are processed again by using the arithmetic mean method, a missing value can be corrected. Furthermore, since near past traffic information and near future traffic information are equally integrated, an irregular movement in the passage time of the vehicle attributable to the delay in entering an intersection or the signal waiting at the intersection can be smoothed.

The prediction circuit 230 includes a prediction model that has been trained to predict a future passage time. The prediction circuit 230 may input an average passage time of vehicles to the trained prediction model, and may also input, to the trained prediction model, the length, road grade, road type, and the number of lanes of a waiting line section, a signal type, information on a day of the week, a time, and an administrative district which are stored in the management circuit 240, including the average passage time. The prediction circuit 230 may derive predicted passage times of vehicles in each direction of progress of the vehicles.

The predicted passage time that is derived by the prediction circuit 230 may be generated for each direction of progress of the vehicles at the intersection, and may be generated by being divided up to an hour in the future from an actual time in the unit of 5 minutes.

The trained prediction model included in the prediction circuit 230 may be a model that has been trained by deep learning based on an artificial neural network.

That is, the prediction model may learn average passage times of vehicles in each direction of progress of the vehicles, which were generated in the past. The apparatus 200 for predicting a passage time may further include a learning circuit (not illustrated) for the training of the prediction model.

The learning circuit may train the prediction model by inputting, to the prediction model, average passage times of vehicles that have been accumulated from the past. The average passage times that have been accumulated from the past may be derived by calculating passage times of the vehicles, which correspond to 10 minutes before and after derivation timing of the vehicles that have passed through a waiting line section in each direction of progress of the vehicles through the arithmetic mean method. The derivation timing may indicate timing of a 5-minute unit at which the average passage time is derived. In other words, the passage time of the vehicle in the waiting line section in which the waiting for an irregular signal and the waiting for the vehicle to enter an intersection or the like have been incorporated can be more accurately predicted by smoothing the passage times through the arithmetic mean method. That is, a speed that is collected in a 5-minute unit may have a missing value. However, since passage times of the vehicles before and after derivation timing of the vehicles are processed again by using the arithmetic mean method, a missing value can be corrected. Furthermore, since near past traffic information and near future traffic information are equally integrated, an irregular movement in the passage time of the vehicle attributable to the delay in entering an intersection or the signal waiting at the intersection can be smoothed.

If the apparatus 200 for predicting a passage time further includes the learning circuit, the learning circuit may train the prediction model by using past average passage times. The prediction circuit 230 may derive a predicted passage time by using the trained prediction model. Furthermore, if the apparatus 200 for predicting a passage time includes the management circuit 240, the learning circuit may learn information that is obtained by operating an average passage time calculated by the arithmetic circuit 220 and waiting line section information and environment information generated by the management circuit 240. In this case, the past average passage times may be derived by calculating passage times of vehicles, which correspond to 10 minutes before and after derivation timing of the vehicles that pass through a waiting line section, for each direction of progress of the vehicles through the arithmetic mean method. The learning circuit may derive a more accurate passage time in the waiting line section when receiving the average passage times by learning the past average passage times. The management circuit 240 may generate waiting line section information, including the length, road grade, road type, and number of lanes of the waiting line section and a signal type of an intersection for each direction of progress of the vehicles, and environment information including information on a day of the week, a time, and an administrative district.

Basic information for waiting line section information and environment information that are generated by the management circuit 240 may be previously stored in the management circuit 240. The basic information may be collected by a probe device installed in each vehicle that runs on a road or may be collected by a probe device installed in a road.

Furthermore, the prediction circuit 230 may receive an average passage time from the arithmetic circuit 220, may receive waiting line section information and environment information from the management circuit 240, and may derive a predicted passage time by inputting the average passage time, the waiting line section information, and the environment information to the trained prediction model. The average passage time, the waiting line section information, and the environment information may be operated with one another before being input to the trained prediction model. The operated information may be input to the trained prediction model. Accordingly, the predicted passage time including information of a waiting line section for each waiting line section and for each direction of progress of vehicles and including information on a time, a day of the week, and an administrative district when the vehicle runs may be derived.

The apparatus 200 for predicting a passage time according to the present embodiment may further include a transmission circuit (not illustrated). The transmission circuit may transmit, to a management server that manages a vehicle navigation, information on a predicted passage time that is generated by the prediction circuit 230. Furthermore, the management server may calculate a route along which a minimum time taken for a user to arrive at a destination is taken by using the predicted passage time, and may provide the user with information on the route.

Figure 3:
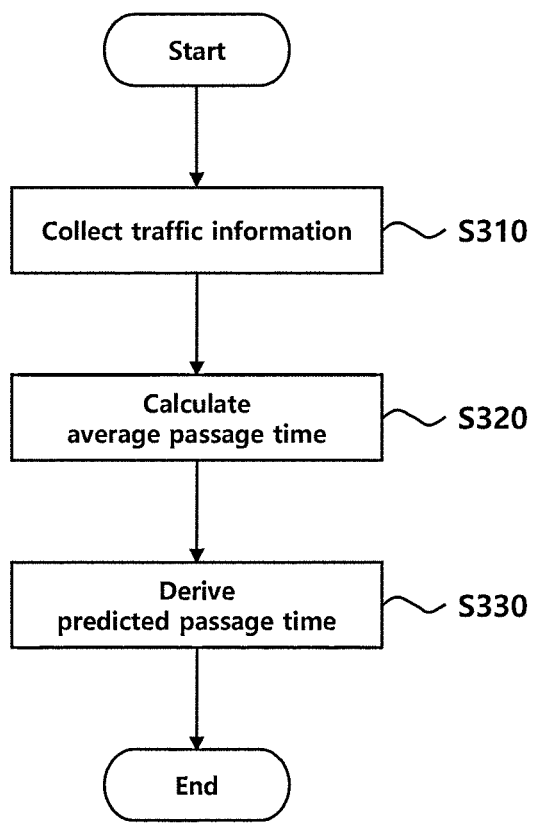
FIG. 3 is a flowchart illustrating a method of predicting a passage time according to an embodiment of the present embodiment.

FIG. 3 is a diagram for describing a method of predicting a passage time according to the present embodiment.

In the method of predicting a passage time according to the present embodiment, step S310 of collecting traffic information including the speeds of vehicles that pass through a waiting line section that is disposed behind an intersection, for each direction of progress of the vehicles in the waiting line section, may be performed.

The traffic information may include measured speeds of the vehicles for each direction of progress at the intersection. The waiting line section may be differently set for each direction of progress of the vehicles. The traffic information may be collected by a probe device installed in each vehicle or may be collected by a probe device installed in a road. Specifically, information on the speed of a vehicle for a waiting line section may be collected by a probe device that has entered and fully passed through the waiting line section 120 for each direction or may be collected by a probe device installed in a road.

Step S320 of calculating passage times of the vehicles for each direction of progress of vehicles that pass through the waiting line section based on the traffic information and the length of the waiting line section and calculating an average passage time for each direction of progress based on the passage times may be performed.

In step S320 of calculating the average passage time, the passage times are calculated for each direction of progress of the vehicles. Accordingly, future passage times of the vehicle in the waiting line section may be predicted for each direction of progress of the vehicles depending on which direction the vehicle proceeds. Since smoothed passage times of vehicles in a waiting line section are used, it may be considered that all of pieces of information, such as information of the signal waiting and the entrance delay at an intersection, have been incorporated into an average passage time. Furthermore, an average passage time of vehicles that pass through waiting line sections may be calculated and derived by using an arithmetic mean method. Specifically, the average passage time may be derived by calculating passage times of the vehicles in the waiting line sections, which correspond to 10 minutes before and after derivation timing of vehicles that pass through the waiting line sections for each direction of progress, through the arithmetic mean method. The derivation timing may indicate timing of a 5-minute unit at which the average passage time is derived. That is, a speed that is collected in a 5-minute unit may have a missing value. However, since passage times of the vehicles before and after derivation timing of the vehicles are processed again by using the arithmetic mean method, a missing value can be corrected. Furthermore, since near past traffic information and near future traffic information are equally integrated, an irregular movement in the passage time of the vehicle attributable to the delay in entering an intersection or the signal waiting at the intersection can be smoothed.

A step (not illustrated) of the prediction model learning past average passage times may be further performed. Specifically, the prediction model may be trained by receiving average passage times that have been accumulated from the past. The average passage times that have been accumulated from the past may be derived by calculating passage times of vehicles, which correspond to 10 minutes before and after derivation timing of the vehicles that have passed through the waiting line section, for each direction of progress of the vehicles through the arithmetic mean method. The derivation timing may indicate timing of a 5-minute unit at which the average passage time is derived. That is, the passage time in the waiting line section in which the waiting for an irregular signal and the waiting for the vehicle to enter an intersection have been considered can be more accurately predicted by smoothing the passage times through the arithmetic mean method.

Furthermore, the prediction model may learn information that is obtained by operating the average passage time, the waiting line section information, and the environment information. Accordingly, when real-time average passage times are input to the prediction model, the prediction model may be trained to predict a future average passage time. In this case, past average passage times may be derived by calculating the passage times of the vehicles, which correspond to 10 minutes before and after derivation timing of vehicles that pass through the waiting line section, for each direction of progress of the vehicles through the arithmetic mean method. The derivation timing may indicate timing of a 5-minute unit at which the average passage time is derived. The learning circuit may derive a more accurate passage time in the waiting line section when receiving the average passage time is input by learning the derivation timing.

Step S330 of inputting the average passage time to the prediction model that has been trained to predict a future passage time and deriving a predicted passage time for each direction of progress of the vehicles from the trained prediction model may be performed.

The trained prediction model may be a model that has been trained by deep learning based on an artificial neural network. The predicted passage time may be derived by being divided up to an hour in the future from an actual time in the unit of 5 minutes.

Prior to step S330 of deriving the predicted passage time, a step (not illustrated) of generating waiting line section information including the length, road grade, road type, and number of lanes of the waiting line section, a signal type of the intersection and environment information including information on a day of the week, a time, and an administrative district, for each direction of progress of the vehicles may be further performed. Basic information for the waiting line section information and the environment information may be previously stored in the management circuit of the apparatus for predicting a passage time, which performs the method of predicting a passage time. The basic information may be collected by a probe device installed in each vehicle that runs on a road or may be collected by a probe device installed in a road.

Furthermore, the average passage time, the waiting line section information, and the environment information may be input to the trained prediction model. Accordingly, the predicted passage time including information of the waiting line section for each waiting line section and for each direction of progress of vehicles and including information on a time, a day of the week, and an administrative district when the vehicle runs may be derived.

A step (not illustrated) of transmitting information on the predicted passage time to a vehicle navigation management server after the predicted passage time is derived may be further performed. The management server may calculate a route along which a minimum time taken for a user to arrive at a destination is taken by using the predicted passage time, and may provide the user with information on the route.

Figure 4:
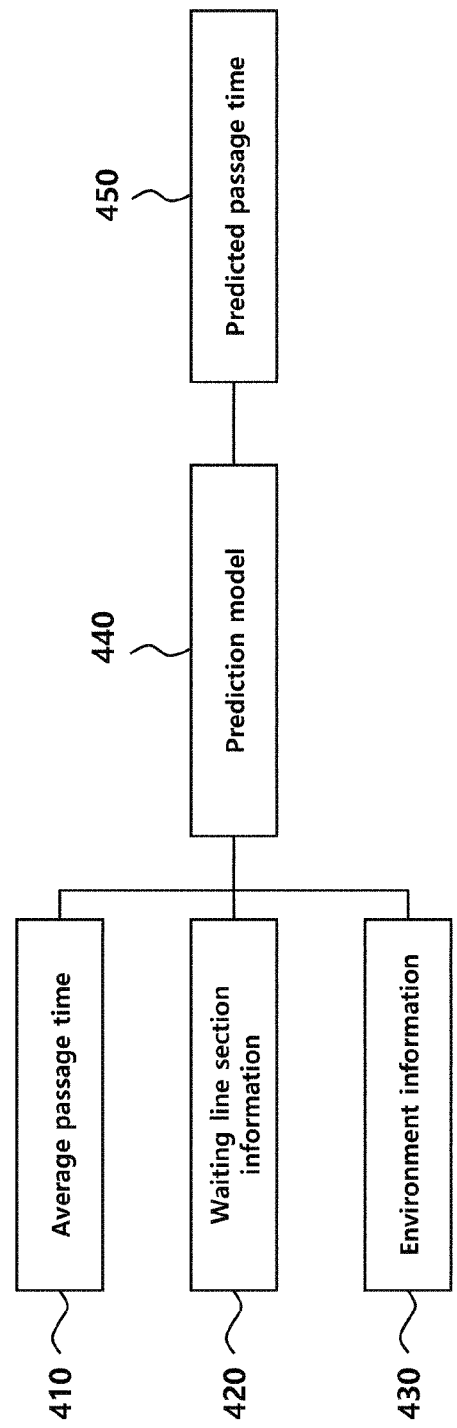
FIG. 4 is a diagram for describing a predicted passage time that is derived by using a prediction model according to an embodiment of the present embodiment.

FIG. 4 is a diagram for describing a predicted passage time which is derived by using the prediction model according to the present embodiment.

In order to calculate a predicted passage time 450 for passing through a waiting line section disposed behind an intersection, an average passage time 410 of vehicles that pass through the waiting line section may be input to a prediction model 440. As illustrated in FIG. 4, waiting line section information 420 and environment information 430 may be input to the prediction model 440 along with the average passage time 410.

The average passage time 410 may be data having a matrix form in which the average passage time of the vehicles have been arranged for each waiting line section and for each time. The waiting line section information 420 and the environment information 430 may be data having a matrix form or a vector form.

The average passage time 410 may be generated by the apparatus for predicting a passage time based on traffic information including the speeds of vehicles that pass through the waiting line section. The traffic information may be collected by a probe device installed in each vehicle or may be collected by a probe device installed in a road. Specifically, information on the speeds of the vehicles for the waiting line section may be collected by a probe device that has entered and fully passed through the waiting line section 120 for each direction or may be collected by a probe device installed in a road.

The waiting line section information 420 may include the length, road grade, road type, and number of lanes of the waiting line section, a signal type of an intersection for each direction of progress of the vehicles. The environment information 430 may include information on a day of the week, a time, and an administrative district.

The waiting line section information 420 and the environment information 430 may be generated based on basic information that has been previously stored in the management circuit of the apparatus for predicting a passage time.

Figure 5:
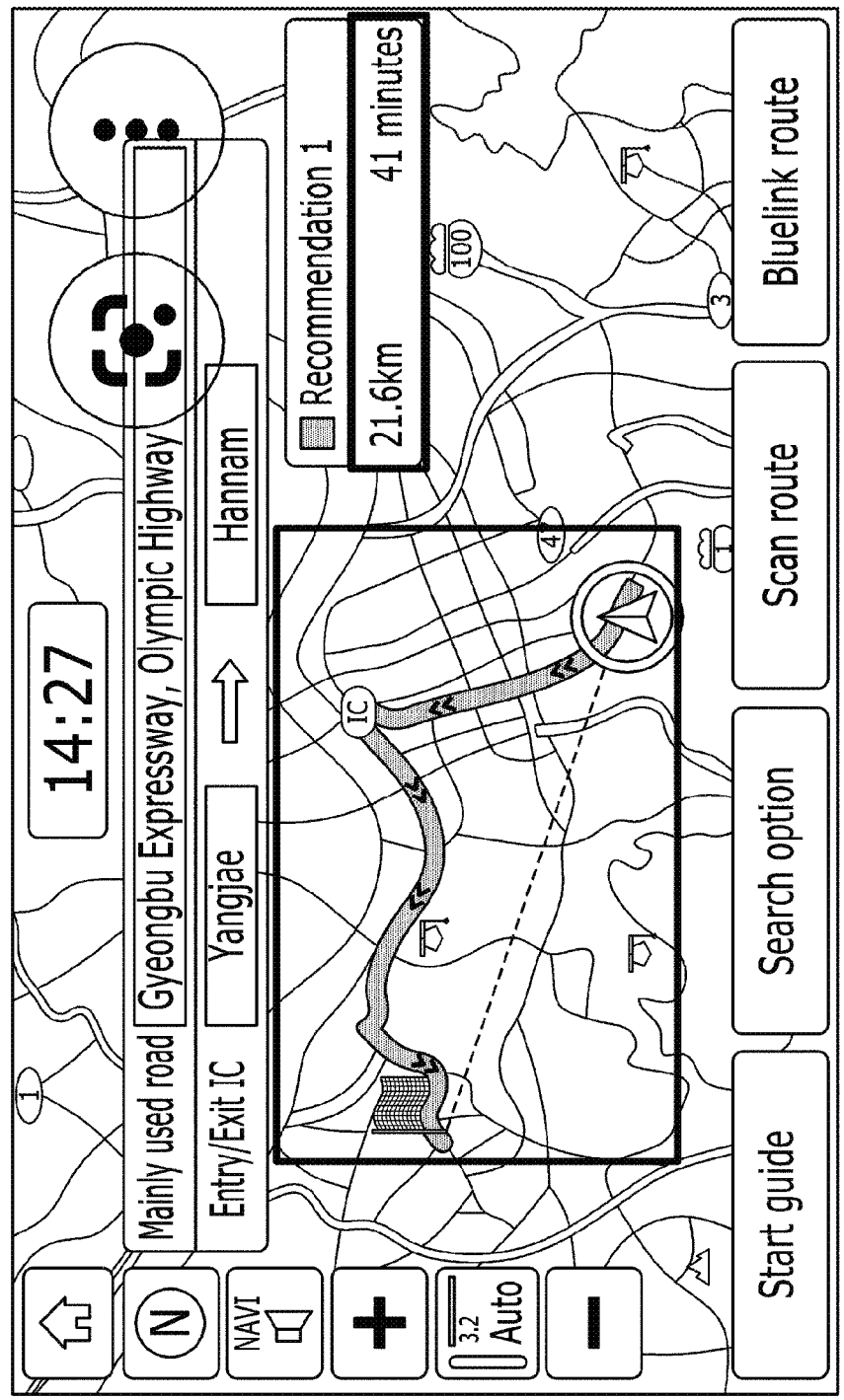
FIG. 5 is an exemplary diagram of a driving route guide using the method of predicting a driving time according to the present embodiment.

FIG. 5 is an exemplary diagram of a driving route guide using the method of predicting a driving time according to the present embodiment.

As illustrated in FIG. 5, while a vehicle runs, in general, the vehicle may pass through a plurality of intersections. Accordingly, if passage times of the vehicles in waiting line sections disposed behind the plurality of intersections can be predicted, a user who drives the vehicle can check the time taken to arrive at his or her destination more accurately, and can be provided with guidance of a driving route that requires a minimum time.

Accordingly, in the method of predicting a driving time according to the present embodiment, a step of collecting traffic information including the speeds of vehicles that pass through waiting line sections disposed behind each intersection for each direction of progress of the vehicles in the waiting line sections may be performed. The waiting line sections may be differently set for each intersection and depending on a direction of progress of the vehicles (e.g., going straight, a left turn, and a right turn). The traffic information may be collected by a probe device installed in each vehicle or may be collected by a probe device installed in a road. Specifically, information on the speed of the vehicles for the waiting line section may be collected by a probe device that has entered and fully passed through the waiting line section 120 for each direction or may be collected by a probe device installed in a road. Furthermore, the traffic information may include information on the speeds of the vehicles.

A step of calculating passage times of vehicles for each waiting line section and for each direction of progress of vehicles that pass through the waiting line sections based on traffic information and the length of the waiting line sections and calculating an average passage time based on the passage times may be performed. The average passage time may be derived by calculating the passage times of the vehicles in the waiting line sections, which correspond to 10 minutes before and after derivation timing of vehicles that pass through the waiting line sections for each direction of progress, through the arithmetic mean method. The derivation timing may indicate timing of a 5-minute unit at which the average passage time is derived. That is, a speed that is collected in a 5-minute unit may have a missing value. However, since passage times of the vehicles before and after derivation timing of the vehicles are processed again by using the arithmetic mean method, a missing value can be corrected. Furthermore, since near past traffic information and near future traffic information are equally integrated, an irregular movement in the passage time of the vehicle attributable to the delay in entering an intersection or the signal waiting at the intersection can be smoothed.

Accordingly, since the average passage time is calculated by smoothing and using the passage times of the vehicles in the waiting line sections, information, such as information of the signal waiting of the vehicle attributable to a traffic light in the intersection and the waiting time for the vehicle to enter the intersection, may have already been incorporated into the average passage time.

A step of generating waiting line section information, including the length, road grade, road type, and number of lanes of a waiting line section, a signal type of an intersection for each direction of progress of vehicles, and environment information including information on a day of the week, a time, and an administrative district may be further performed.

A step of inputting an average passage time to the prediction model that has been trained to predict a future passage time may be performed. The trained prediction model may be a model that has been trained by deep learning based on an artificial neural network. If both waiting line section information and environment information are used in the method of predicting a driving time, the average passage time, the waiting line section information, and the environment information may be input to the trained model. The average passage time, the waiting line section information, and the environment information may be operated with one another before being input to the trained model.

Furthermore, in order to generate the trained prediction model, a learning step of training the prediction model by inputting past average passage times to the prediction model may be further performed. If both waiting line section information and environment information are used in the method of predicting a driving time, the prediction model may be trained by inputting, to the prediction model, information obtained by operating an average passage time, the waiting line section information, and the environment information with one another. In this case, the past average passage time may be derived by calculating passage times corresponding to 10 minutes before and after derivation timing of vehicles that pass through a waiting line section for each direction of progress of the vehicles through an arithmetic mean method. In this case, the derivation timing may indicate timing of a 5-minute unit in which an average passage time is derived.

The prediction model may be trained by receiving average passage times that have been accumulated from the past. The average passage times that have been accumulated from the past may be derived by calculating passage times of the vehicles, which correspond to 10 minutes before and after derivation timing of the vehicles that have passed through the waiting line section, for each direction of progress of the vehicles through the arithmetic mean method. The derivation timing may indicate timing of a 5-minute unit at which the average passage time is derived. In other words, the passage time in the waiting line section in which the waiting for an irregular signal and the waiting for the vehicle to enter an intersection or the like have been considered can be more accurately predicted by smoothing the passage times through the arithmetic mean method. In other words, a speed that is collected in a 5-minute unit may have a missing value. However, since passage times of the vehicles before and after derivation timing of the vehicles are processed again by using the arithmetic mean method, a missing value can be corrected. Furthermore, since near past traffic information and near future traffic information are equally integrated, an irregular movement in the passage time of the vehicle attributable to the delay for the vehicle to enter an intersection or the signal waiting at the intersection can be smoothed.

A step of deriving predicted passage times from the trained prediction model for each waiting line section and for each direction of progress may be performed. The predicted passage time may be generated by being divided in the unit of 5 minutes within an hour in the future from an actual time. Accordingly, a passage time in a waiting line section for each intersection can be predicted.

A step of deriving a route having the smallest sum of predicted passage times, among waiting line sections through which vehicles may pass in order to arrive at their destinations, may be performed. A driving route having a minimum time may be derived through the sum of predicted passage times in waiting line sections for each intersection through which users have to drive their vehicles and arrive at their destinations.

Accordingly, a problem with an interrupted flow waiting line having a low information collection rate can be solved, and a user can be provided with guidance of an accurate and scheduled arrival time for a destination.

The term "include", "constitute" or "have" described above, unless specially mentioned otherwise, means that a corresponding component may be included. Accordingly, it is to be interpreted that the term may further include another component without excluding another component. All terms used herein, including technical terms or scientific terms, have the same meanings as those commonly understood by a person having ordinary knowledge in the art to which the present disclosure pertains, unless defined otherwise in the present disclosure. Terms that are commonly used, such as those defined in dictionaries, should be construed as having the same meanings as those in the context of a related technology, and are not construed as ideal or excessively formal meanings unless explicitly defined otherwise in the application.

The above description is merely a description of the technical spirit of the present disclosure, and those skilled in the art may change and modify the present disclosure in various ways without departing from the essential characteristic of the present disclosure. Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of rights of the present disclosure.

What is claimed is:

1. A method of predicting a passage time comprising:
collecting traffic information comprising speeds of vehicles that pass through a waiting line section disposed behind an intersection in each of a plurality of directions of progress of the vehicles in the waiting line section;
calculating passage times of vehicles that pass through the waiting line section in each direction of the progress based on the traffic information and a length of the waiting line section;
calculating an average passage time for each direction of the progress based on the passage times;
inputting the average passage time to a prediction model trained to predict a future passage time;
deriving a predicted passage time for each direction of the progress from the trained prediction model; and
displaying a route over specific geographic areas of a map based on the predicted passage time for each direction of the progress.

2. The method of claim 1, wherein:
the average passage time is derived by calculating passage times corresponding to 10 minutes before and after derivation timing of the vehicles that have passed through the waiting line section in each direction of the progress by using an arithmetic mean method, and
the derivation timing indicates timing of a 5-minute unit at which the average passage time is derived.

3. The method of claim 1, wherein:
the prediction model is trained by receiving average passage times that have been accumulated from the past according to time series,
the average passage times that have been accumulated from the past are derived by calculating passage times corresponding to 10 minutes before and after derivation timings of the vehicles that have passed through the waiting line section in each direction of the progress by using an arithmetic mean method,
the derivation timing indicates timing of a 5-minute unit at which the average passage time is derived, and
the predicted passage time is derived by being divided in a unit of 5 minutes up to an hour in a future from an actual time for each direction of the progress.

4. The method of claim 1, wherein the waiting line section is differently set for each direction of the progress of the vehicles.

5. The method of claim 1, wherein the trained prediction model is a model trained by deep learning based on an artificial neural network.

6. The method of claim 1, further comprises generating waiting line section information comprising a length, a road grade, a road type, and a number of lanes of the waiting line section, a signal type of the intersection in each direction of the progress and environment information comprising information on a day of a week, a time, and an administrative district,
wherein the average passage time, the waiting line section information, and the environment information are input into the trained prediction model.

7. An apparatus for predicting a passage time, the apparatus comprising:
a collection circuit configured to collect traffic information, comprising speeds of vehicles that pass through a waiting line section disposed behind an intersection in each of a plurality of directions of progress of the vehicles in the waiting line section;
an arithmetic circuit configured to calculate passage times of vehicles that pass through the waiting line section in each direction of the progress based on the traffic information and a length of the waiting line section and configured to calculate an average passage time for each direction of the progress based on the passage times;
a prediction circuit comprising a prediction model trained to predict a future passage time and configured to input the average passage time to the trained prediction model and configured to derive a predicted passage time in each direction of the progress; and
a display screen which displays a route over specific geographic areas of a map based on the predicted passage time in each direction of the progress.

8. The apparatus of claim 7, wherein:
the arithmetic circuit is configured to derive the average passage time by calculating passage times corresponding to 10 minutes before and after derivation timing of the vehicles that have passed through the waiting line section in each direction of the progress by using an arithmetic mean method, and
the derivation timing indicates timing of a 5-minute unit at which the average passage time is derived.

9. The apparatus of claim 7, further comprising: a management circuit configured to generate waiting line section information comprising a length, a road grade, a road type, and a number of lanes of the waiting line section, a signal type of the intersection for each direction of the progress and environment information comprising information on a day of a week, a time, and an administrative district.

10. The apparatus of claim 7, further comprising: a transmission circuit configured to transmit the predicted passage time to a vehicle navigation management server.

11. The apparatus of claim 7, further comprising: a learning circuit configured to train the prediction model by inputting, to the prediction model, average passage times that have been accumulated from the past according to time series,
wherein the average passage times that have been accumulated from the past are derived by calculating passage times corresponding to 10 minutes before and after derivation timings of the vehicles that have passed through the waiting line section in each direction of the progress by using an arithmetic mean method, and
the derivation timing indicates timing of a 5-minute unit at which the average passage time is derived.

12. A method of predicting a driving time, comprising:
collecting traffic information comprising speeds of vehicles that pass through waiting line sections disposed behind intersections in each of a plurality of directions of progress of the vehicles in the waiting line sections;
calculating passage times of vehicles that pass through the waiting line sections for each waiting line section and in each direction of the progress based on the traffic information and lengths of the waiting line sections;
calculating an average passage time in each direction of the progress based on the passage times;
inputting the average passage time to a prediction model trained to predict a future passage time;
deriving predicted passage times for each direction of the progress from the trained prediction model;
deriving a route having a smallest sum of predicted passage times, among the waiting line sections through which the vehicles pass through in order to arrive at their destinations; and
displaying the route over specific geographic areas of a map based on the route having the smallest sum of predicted passage times.

13. The method of claim 12, wherein:
the average passage time is derived by calculating passage times corresponding to 10 minutes before and after derivation timing of the vehicles that have passed through the waiting line sections in each direction of the progress by using an arithmetic mean method, and
the derivation timing indicates timing of a 5-minute unit at which the average passage time is derived.

14. The method of claim 12, further comprising generating waiting line section information comprising a length, a road grade, a road type, and a number of lanes of the waiting line section, a signal type of the intersection for each direction of the progress and environment information comprising information on a day of a week, a time, and an administrative district,
wherein the trained prediction model is a model trained by deep learning based on an artificial neural network, and
the average passage time, the waiting line section information, and the environment information are input into the trained prediction model.

15. The method of claim 12, wherein:
the prediction model is trained by receiving average passage times that have been accumulated from the past according to time series,
the average passage times that have been accumulated from the past are derived by calculating passage times corresponding to 10 minutes before and after derivation timings of the vehicles that have passed through the waiting line section in each direction of the progress by using an arithmetic mean method,
the derivation timing indicates timing of a 5-minute unit at which the average passage time is derived, and
the predicted passage time is derived by being divided in a unit of 5 minutes up to an hour in a future from an actual time for each direction of the progress.

* * * * *